United States Patent [19] [11] Patent Number: 4,633,431
Bar [45] Date of Patent: Dec. 30, 1986

[54] ARRANGEMENT FOR COUPLING DIGITAL PROCESSING UNITS

[75] Inventor: Albrecht Bar, Buckenhof, Fed. Rep. of Germany

[73] Assignee: Siemens Aktiengesellschaft, Munich, Fed. Rep. of Germany

[21] Appl. No.: 486,060

[22] Filed: Apr. 18, 1983

[30] Foreign Application Priority Data

Apr. 22, 1982 [DE] Fed. Rep. of Germany ....... 3215080

[51] Int. Cl.⁴ .......................... G06F 15/16; G06F 11/00
[52] U.S. Cl. ................................................. 364/900
[58] Field of Search ... 364/200 MS File, 900 MS File; 371/71

[56] References Cited

U.S. PATENT DOCUMENTS

| | | | |
|---|---|---|---|
| 3,308,436 | 3/1967 | Borck | 364/200 |
| 3,997,879 | 12/1976 | Markley | 364/900 |
| 4,085,448 | 4/1978 | Kogge | 364/900 |
| 4,155,071 | 5/1979 | Shamburger | 371/71 |
| 4,228,496 | 10/1980 | Katzman et al. | 364/200 |
| 4,259,663 | 3/1981 | Gable | 371/71 |
| 4,376,999 | 3/1983 | Abbott | 371/71 |
| 4,549,047 | 10/1985 | Brian | 364/200 |

Primary Examiner—David Y. Eng
Attorney, Agent, or Firm—Kenyon & Kenyon

[57] ABSTRACT

A data bus system in which digital processing modules are associated with the busses in matrix fashion is disclosed. The modules contain respective intelligent and autonomously operating coupling units, by which information distribution on the busses, fault detection and error processing may be transacted in a decentralized manner. The system is highly secure and fault-tolerant. A corresponding matrix bus system together with the corresponding current couplers can also connect power supplies associated with each of the modules to each other in the event of failure of the power supply in an individual module.

9 Claims, 10 Drawing Figures

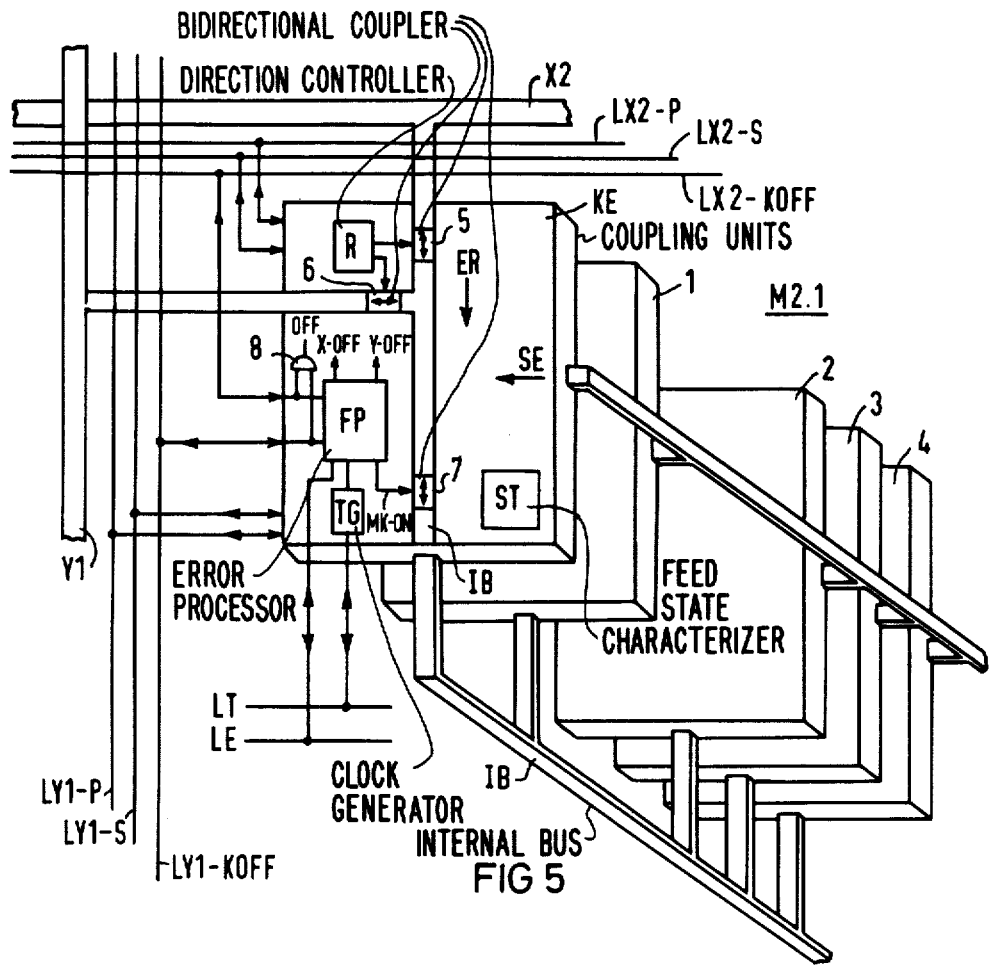
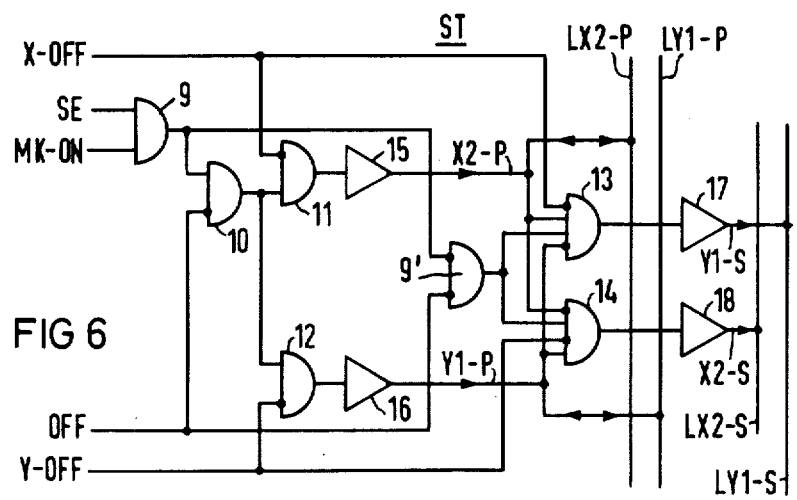

| CASE | e1 | e2 | e3 | e4 | e5 & e6 | e7 | e8 | e9 | a1 | a2 | a3 | a4 | |
|---|---|---|---|---|---|---|---|---|---|---|---|---|---|
| I | 0 | – | – | 0 | L | – | – | 0 | L | 0 | 0 | L | X2─a1, Y1─a4 |
| II | 0 | – | – | 0 | 0 | – | – | L | 0 | L | 0 | 0 | X2─a2, Y1 |
| III | L 0 0 0 | – L – 0 | – – 0 0 | 0 0 0 0 | 0 0 0 0 | – – – 0 | – L L 0 | 0 0 0 0 | 0 | 0 | L | 0 | X2─a3, Y1 |
| IV | 0 0 | – 0 | 0 0 | 0 0 | 0 0 | L 0 | – L | 0 0 | L | 0 | L | 0 | X2─a1, Y1─a3 |
| V | 0 0 | – L | L 0 | 0 0 | 0 0 | 0 0 | – 0 | 0 0 | 0 | L | 0 | L | X2─a2, Y1─a4 |
| VI | – | – | – | L | – | – | – | – | 0 | 0 | 0 | 0 | X2, Y1 |

ARRANGEMENT FOR COUPLING DIGITAL PROCESSING UNITS

BACKGROUND OF THE INVENTION

The present invention relates to an arrangement for coupling digital processing units (modules) of a redundantly operating multi-computer system, in which processor modules can be coupled to two external data busses. Arrangements of this type are known from DE-OS No. 27 40 056 and its counterpart, U.S. Pat. No. 4,228,496. In that patent, the processor modules are in communication with each other via two interprocessor busses operated in parallel, and a central controller i.e., a controller which is common to all modules, is provided for each of these data busses. From a reliability point of view this arrangement must be considered as unsatisfactory, because in the event of failure of one such controller, half of the available transmission channels are disabled, and the failure of more than one data bus cannot be tolerated. Furthermore, the number of modules which can be operated together is limited for loading reasons to the number of the units which can be connected to one bus.

In view of the above, it is an object of the present invention to divide the data transmission channels into a larger number of units separated from each other to provide redundancy in the event of failures and to transact the data traffic through them. This avoids any central control devices in such a way that the failure of several busses can be tolerated without impairing transmission speed and in most cases also without exclusion of digital processing units connected to these busses.

SUMMARY OF THE INVENTION

This and other objects of the present invention are achieved in an arrangement for coupling digital processing units or modules, particularly of a redundantly operating multiprocessor system, comprising:

a first external bus system having a first group and a second group of at least two external busses each with which the modules are coupled in matrix-fashion;

first bidirectional coupling means in each module which is provided with direction control means for controlling the direction of data through the coupling means, the coupling means coupling the external busses to an internal bus of each module; and at least one status line means accompanying each external bus coupled to the modules associated with the bus, the signal on the status line means being determined by the modules transmitting to the status line means and controlling the coupling direction of the remaining modules so that a transmitted signal is passed on to all busses of the external bus system.

A substantially more fault-tolerant bus system is thereby created, the redundancy or reliability of which can be chosen at will. In addition, the number of modules which can be operated together is multiplied accordingly because of the subdivision of the data transmission channels into a multiplicity of busses supplied every time with refreshed information.

BRIEF DESCRIPTION OF THE DRAWINGS

The present invention will be described in greater detail in the following detailed description with reference to the drawings in which:

FIG. 5 shows in detail one module of the coupling arrangement;

FIGS. 6 and 7a are logic diagrams of components of the module shown in FIG. 5;

FIG. 7b is a logic table for the logic diagram of FIG. 7a;

DETAILED DESCRIPTION

Figure 1:
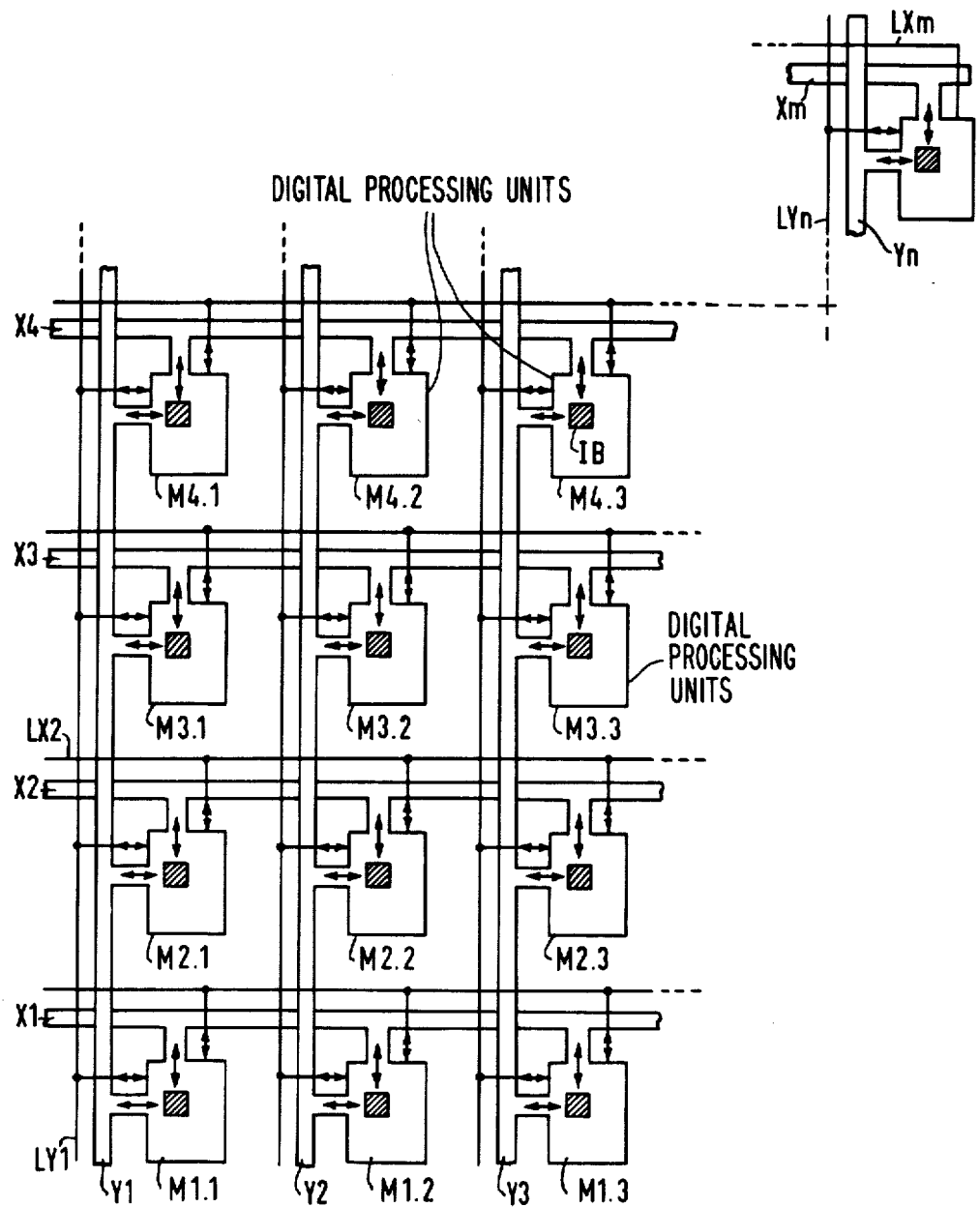
FIG. 1 shows in block diagram form the general coupling arrangement according to the invention.

With reference now to the drawings, FIG. 1 shows the basic design of the coupling arrangement according to the invention. A first group of horizontally depicted busses X1 to Xm and a second group of vertically depicted busses Y1 to Yn, each of which can be coupled bidirectionally to the internal busses IB of digital processing units or modules (M1.1 to Mn.m) by means of coupling members, which are only illustratively indicated, are provided. Digital processing units, called modules in the following for abbreviation, are understood to mean any bus-oriented devices such as parts of memories, processing units, processors for input/output, etc. The relationship to the individual busses is in matrix-fashion, i.e., every module can be coupled to a bus of the one group and to a bus of the other group, but no two modules are coupled to the same two busses. In this manner, every module can receive data from the two busses associated therewith and can transmit to them, respectively, where the busses are assigned to modules ready to transmit in a manner known per se but not shown here, by means of decentralized bus arbiters assigned to each module, for instance, as shown in the journal "Elektronik" no. 1, 1981, pages 81 to 85. Each module can further connect the two busses associated with it in both directions of information flow, i.e., the module can be a transmission bridge between the two busses and advantageously refresh the received information in relay-fashion.

Each bus is accompanied by a status line LX1 to LXm and LY1 to LYn, respectively, the signal state of which is determined by the redundantly transmitting modules and is evaluated in all other modules for determining the pass direction of their coupling members. By means of these status lines, it can therefore be decided in each module whether and which of the two busses associated with it further needs to be supplied by another bus so that then appropriate coupling instructions for the coupling members of each module can be formed. Information sent by any module to the two busses associated therewith is thereby made available at all busses with the cooperation of the other modules and can therefore also be received by any module without the need for a central data path control for this purpose.

If the same information already exists on both busses associated with a not originally sending module, coupling from bus to bus by the coupling device of this module is unnecessary. Signal errors due to propagation time effects could furthermore not be precluded if the module receives the information via two transmission paths of different length which are due to a different distance between the originally sending module and the two busses associated with the receiving or not originating module. It is therefore advisable to design the coupling control in such a way that for the same signal state of two bus status lines, the internal bus of the associated module is coupled, in the case when it does not transmit, always only to the bus belonging to a certain group, for instance, to the bus belonging to the Y-group. Double feeding is therefore avoided in the case of the modules, and multiple feeding via a not originating module in the case of the busses. However, there is always available to each not originating module a second transmission path which can be activated at any time if the other one fails.

In the arrangement shown in FIG. 1, the information propagates from an originating module to the other modules largely undetermined, i.e., the receiver module to be addressed could be reached in principle via a bus fed by the originating module, i.e., directly, as well as via a bus acted upon by a passing-on module, i.e., via a bus fed secondarily. An information supply as close to the source as possible, which is desirable especially in extensive bus networks, can be achieved by a further bus status line for each bus which carries a signal if the respective bus is fed by a passing-on bus, i.e., secondarily. The direction-of-coupling controls of the modules are then designed so that the modules pass-on with priority the information of busses fed primarily. By means of this second status line, every module can contribute autonomously its part to this hierarchic coupling which brings about an optimum information distribution, without the need to provide a central control device for this purpose.

Figure 2:
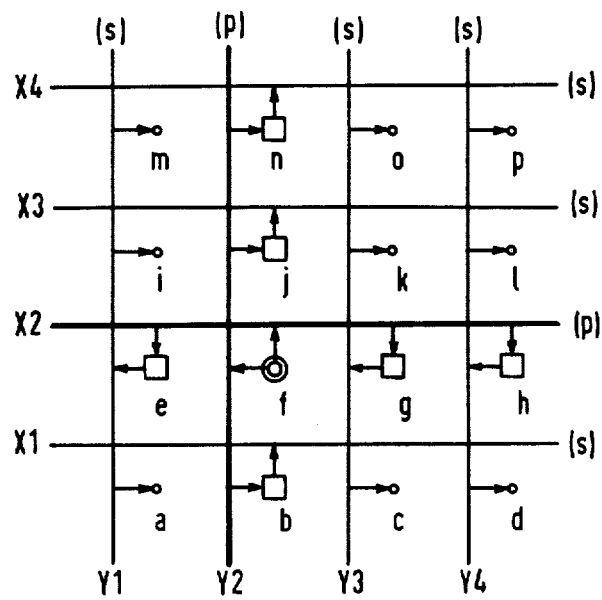
FIG. 2 is a block diagram illustrating one particular coupling state of the coupling arrangement shown in FIG. 1.
Figure 3:
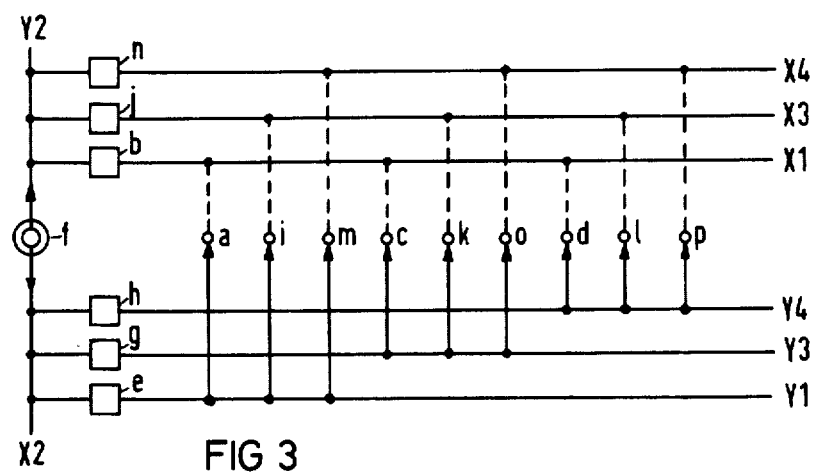
FIG. 3 shows the example of FIG. 2 in a different form for purposes of explanation.
Figure 4:
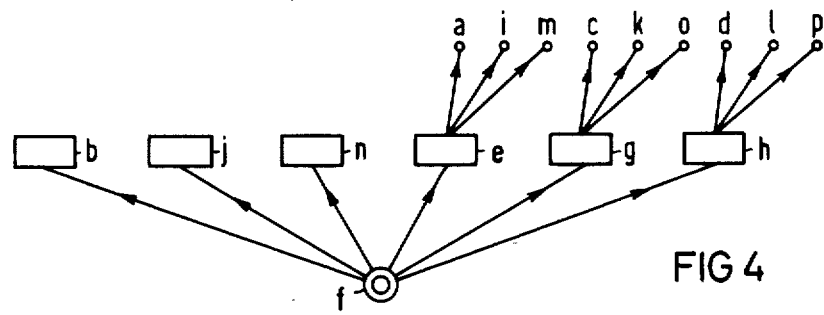
FIG. 4 shows the diagram of FIG. 2 in an alternate tree-type form for purposes of explanation.

FIGS. 2 to 4 show the network-topological effects of this coupling arrangement with the aid of an example. The bus matrix shown in FIG. 2 comprises the vertical busses Y1 to Y4 and the horizontal busses X1 to X4, each of which is accompanied by status lines, not shown for the sake of clarity. The status lines are driven in the manner described above and their signal states are evaluated in the individual modules. The modules of the system are represented by their internal busses designated by a to p, and the activated couplers belonging to the modules by arrows of the proper direction. In the assumed operating case, the module f will transmit as the originator, i.e., the busses X2 and Y2 are fed by it as the primary information source. This originating module f brings about on the first bus status lines of the busses X2 and Y2 a signal which marks them as primary-fed as indicated by (p). By means of this signal, the direction controls in the modules e, g, h and b, j and n will determine that one of the two busses associated with them is primary-fed and the other one is not, whereupon the direction control effects the coupling of the vertical bus Y2 to the busses X1, X3 and X4, and the coupling of the busses Y1, Y3 and Y4 to the horizontal bus X2. The corresponding second bus status lines thereupon receive a signal which characterizes the busses Y1, Y3 and Y4 as well as X1, X3 and X4 as secondary-fed busses, as indicated by (s), which in turn causes the remaining modules, in which the two busses associated with them are characterized by their second status lines as secondary-fed, to couple only to busses of a predetermined group; in the example of FIG. 2, to the group of the vertical busses only.

FIG. 3 shows a presentation of the coupling state shown in FIG. 2, in which the transmission paths which are not activated but are in readiness, are shown by dashed lines. This makes clear that the information source (the internal bus of module f in the assumed case) is connected to all other modules always via only one path; that each bus is fed only once; that the same information is present on all transmission paths, i.e., all busses; and that in the event of a failure of a transmission path active in FIG. 3, every module can be reached by the signal source via a second path at any time by activating one of the transmission paths shown dashed.

FIG. 4 shows the tree-like structure of the information transmission paths with the information source f as the root. It is essential that within the module connecting system shown in FIG. 2, every single module can become such a signal source and the channel-like connection shown in FIG. 4 can be established exclusively and automatically by the direction control of the couplers belonging to each module, from the respective signal source to each module of the matrix network. Thus, the matrix bus according to the invention can also be used advantageously in so-called local networks or for data communications between several data processing units.

Important in all multi-computer systems is the detection and identification of faults with subsequent exclusion of the defective parts from further signal processing. Since each module has available to it the information on the two busses associated with it and the same information must always be available to all busses in the undisturbed case through the above-described direction control, a fault can be detected in each module. While it might be sufficient to compare the information on the two busses with each other, for which purpose only one comparator per module would have to be provided, it would also be preferable to include, in an error detecting system, the proper operation of the bidirectional couplers, for which purpose two comparators are provided per module which monitor the signal state before and after each of the two bidirectional couplers, respectively. The output signals of the comparators of all modules are fed to a common fault bus. An error processor is provided in each module or its coupling unit which is connected on the input side to the error bus and which initiates a fault search program if a collective error signal released by any module appears on the error bus. An identification number is assigned to every module, so that with this fault search program which is identical for all error processors, certain modules or module groups can tentatively be switched off sequentially and the fault that has occurred can be localized in this manner. So that the error processing programs of the individual module error processors can proceed synchronously or in a coordinated manner, each of the coupling units contains a clock generator which is synchronized mutually via a common clock line which may optionally be secured by multiple redundancy.

FIG. 5 now shows in detail the basic design of a module including the couplers which couple the module to the busses associated with it and the external signal lines. The module M2.1 shown in FIG. 5 is typical for all modules of the coupling system, so that the overall design as shown in FIG. 1 is maintained. The module has an internal bus designated IB, to which digital assemblies, not specified in detail, such as a central unit, memory groups, transmitter amplifiers, etc. are connected in the customary manner and which are disposed on boards 1 to 4. The module further comprises a coupling unit KE which contains three bidirectional couplers 5, 6 and 7. Via bidirectional couplers 5, 6 and 7 the internal bus IB can be coupled in the transmitting or receiving direction to one or both of the busses X2 and Y1, which are associated with the module M2.1. A direction controller R, which will be described in detail later, controls the information flow direction of bidirectional couplers 5 and 6 while coupler 7 is controlled by an error processor FP. The time cycle of the fault search and processing program performed by the error processor FP is determined or coordinated by a clock generator TG, the clock signal of which is also fed to a clock line LT common to all modules. The error processor FP evaluates the signals appearing on line LE, the error line. In this manner it can be achieved that the clock generators contained in the remaining modules mutually synchronize themselves, so that synchronous operation of the fault search programs of each of the error processors of all modules is achieved. Mutually synchronizing clock generators using a common clock line are known, for instance, from DE-AS No. 21 55 159.

The coupling unit KE further contains a device, designated ST, for characterizing the feed state of the busses Y1 and X2. This device delivers a signal to the bus status lines LY1-P and LX2-P if a transmission is to take place from the module via its internal bus IB, which is initiated by the transmitting signal SE generated in the module. In case the transmitting signal is not present, i.e., it is a zero signal, and only one of the lines LX2-P or LY1-P is at a logic 1 level (hereinafter an L-signal) due to another module originating onto this bus, the bidirectional couplers 5 and 6 are controlled by means of the direction controller R in such a manner that the primary-fed bus feeds the other one. The status circuit ST then feeds to the bus status line LY1-S or LX2-S, respectively, an L-signal, whereby this bus is marked as secondary-fed. The signal status of the bus status lines (in the example shown, the lines LY1-P, LY1-S, LX2-P and LX2-S) are evaluated in each module for controlling the couplers 5 and 6. For switching off one or several modules determined under program control, the error processor FP delivers shut-off signals X-OFF and Y-OFF acting only in the coupling unit belonging to the module, by which the bidirectional couplers 5 and 6 can be decoupled from the X-bus or the Y-bus, respectively. The error processor further delivers the signal MK-ON to bidirectional coupler 7 to couple the internal bus IB to the coupling unit.

There are various possible embodiments for the error-processing program which is running simultaneously in all error processors of each of the modules after a signal appears on the error bus LE. It is found advantageous to start, for the tentative disconnection of the individual components, with the smallest recognizable failure units, namely, the internal busses or the module assemblies 1 to 4 supplied by them. One can therefore decouple, and then couple again, tentatively from (or to) the error processors by means of shut-off signals MK-ON generated by them sequentially, module by module, by blocking the corresponding bidirectional couplers 7 until the error signal on the error bus LE disappears. It is also possible to proceed by means of successive approximation with module groups in this manner, i.e., to decouple and couple in one program step simultaneously, for instance, one-half of all modules by blocking their bidirectional couplers 7 and then by repeating this step for half of the other half, repetitively. In this manner the error can be localized rather quickly, the defective module recognized and the latter then permanently switched off. It is important that in such a fault search program the coupling function of the bidirectional couplers 5 and 6 and therefore, the information supply of the modules which are not switched off, be preserved. If the fault has not been found via these tentative shut-offs, a next practical step could be to separate the modules successively point-wise from the two busses associated with the module by means of a simultaneous output of the internal switching-off signals X-OFF and Y-OFF. In this manner, faults in the bidirectional couplers 5 and 6 can be detected. Bus faults can be localized if in one program step the corresponding bidirectional couplers 5 and 6 are blocked simultaneously by delivering their two internal switching-off signals X-OFF or Y-OFF.

These switching-off attempts are caused by the error processors belonging to the modules and are brought about by the internal switching signals X-OFF, Y-OFF and MK-ON. In case the error processor itself belonging to the module is defective and can no longer carry out the switching-off operations demanded of it, an external switching-off line is provided per bus which is designated with LX2-KOFF and LY1-KOFF in FIG. 5. These switching-off lines are now likewise supplied, program-controlled, by the error processors of the modules associated with these busses, and their signals X2-KOFF and Y2-KOFF are conjunctively linked to each other in a gate 8 belonging to the module. If both of the switching-off lines accompanying the associated busses carry L-signals, then the signal OFF appears at the output of the AND gate 8, whereby a general shut-off of the module is effected, i.e., simultaneous blocking of the bidirectional couplers 5 and 6. In contrast to the switching-off operations caused by the error processor belonging to the module, the switching-off of a module is now accomplished by the error processors of its adjacent modules coupled to the same busses.

Figures 7, 7A:
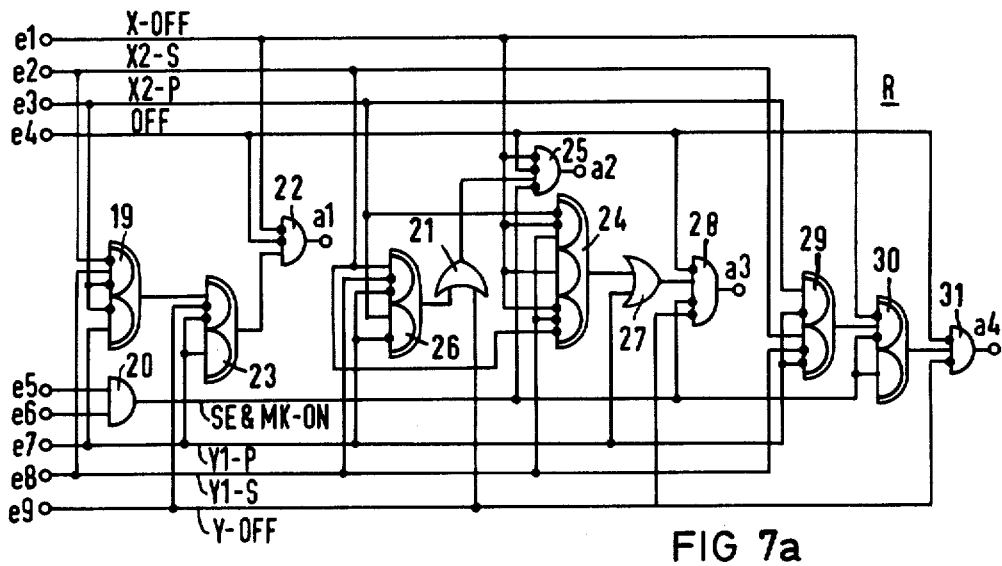
Figure 8:
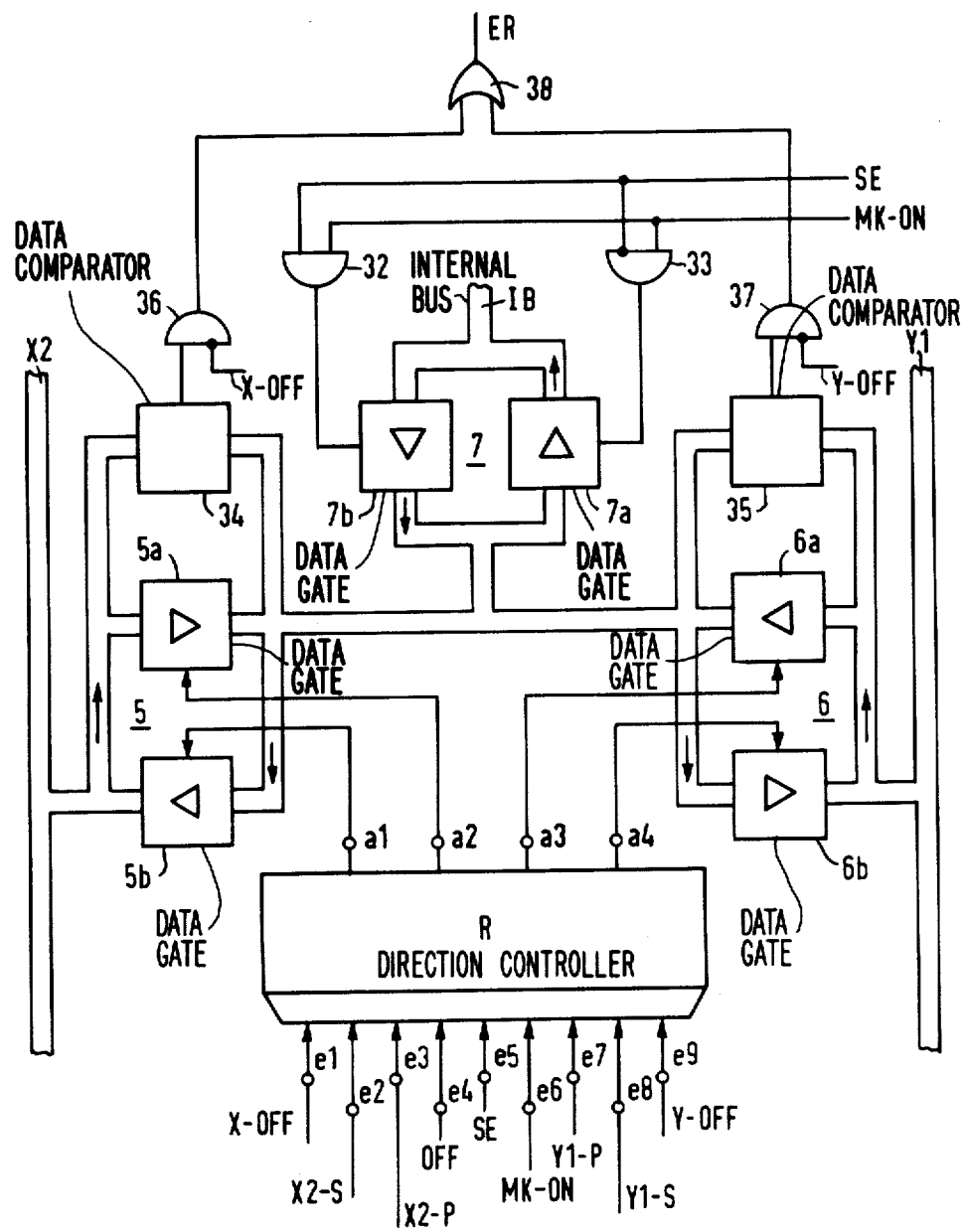
FIG. 8 is a logic diagram of a further component of the module shown in FIG. 5.

FIGS. 6 to 8 show by way of example embodiments of components of the coupling unit KE shown in FIG. 5.

According to FIG. 6, the status circuit ST contains gates 9 to 14 and 9.1 and transmitting amplifiers 15 to 18 for generating the status signals X2-P, X2-S, Y1-P and Y1-S of the status lines LX2-P, LX2-S, LY1-P, and LY1-S accompanying this module. If this module is to originate transmissions (signal SE=L and MK-ON=L), the gates 13 and 14 are blocked and the signals X2-P and Y1-P are passed-on to lines LX2-P and LY1-P. If due to the transmission of another module, these lines already carry L-signals, L-signals will appear at the respective gates 13 and 14 and the transmitting amplifiers 17 and 18 emit corresponding signals which indicate secondary feeding of the lines LX2-S and LY1-S accompanying the bus. Sending of bus status signals is inhibited if the switching-off signals Y-OFF and X-OFF, respectively, which are generated by the error processor belonging to the module, appear, as well as when the general switching-off signal OFF caused by the error processors of the adjoining module occurs.

In FIG. 7a, the internal circuitry of the direction control device R is shown which contains the gates 19 to 31 which are addressed by the signals X-OFF, X2-S, X2-P, OFF, SE, MK-ON, Y1-P, Y1-S and Y-OFF present at the input terminals e1 to e9. The gate 20 outputs an L-signal if both signals SE and MK-ON, fed-in at the input terminals e5 and e6 are L-signals. The gates 19, 23, 24, 26, 29 and 30 are shown as so-called combination gates, i.e., they comprise the OR linkage of the output signals of a number of AND gates. A dot at a gate input designates in the customary manner an inversion of the incoming signal. The signals at the output terminals a1 to a4 of the gates 22, 25, 28 and 31 are associated with the data gates of the bidirectional couplers 5 and 6 and specifically, the latter are switched into the pass state if the signals a1 to a4 at the output terminals are respectively L-signals. The operation of the direction control R achieved by this circuit is shown in FIG. 7b with the aid of a logic table. The latter shows the signals appearing at the four output terminals a1 to a4 as a result of the respectively correlated signal combination of the signals at the input terminals e1 to e9 for the possible coupling cases I to VI which are reproduced graphically in the last column of this Table. This column shows the busses X2 and Y1 associated with the module M2.1, its internal bus as well as those output terminals of the direction control device R which must have L-signals for the coupling direction indicated by an arrow for the corresponding operation of the data gates of the bidirectional couplers 5 and 6 in the respective case of coupling. The combinations of the signals at the input terminals e1 to e9 required for the individual cases of coupling are shown in the left-hand part of the Table. Signal conditions shown next to each other in a row must be fulfilled in AND logic. A dash means that the value of the corresponding input signal is immaterial for the operating case to be realized. In the coupling cases III to V, several combinations of the input signals at the terminals e1 to e9 are arranged one below the other in rows, which signifies that for this operating case any of the combinations shown may be fulfilled. In the case of coupling III, the signal combination in its second row is noteworthy, which has the effect that in case both busses associated with the module are secondary-fed, the module is coupled in the receiving direction only to the Y1-bus belonging to the Y-group. The coupling case VI clearly shows that the effect of the general shut-off signal OFF at the input terminal e4 is to isolate the internal bus of the module completely.

FIG. 8 shows the arrangement of the data gates 5a,b and 6a,b of the bidirectional couplers 5 and 6 as well as the arrangement for forming the error signal ER. The data gates 5a and 5b and 6a and 6b comprise transmitting amplifiers which can be switched to pass data in the directions indicated by the arrows by the signals at the output terminals a1 to a4 of the direction controller R. The internal bus IB is likewise connected via two such amplifiers 7a and 7b of the bidirectional coupler 7 to the two bidirectional couplers 5 and 6, which if required can be switched to pass data by the output signals of the AND gates 32 and 33. If the module is ready for operation (signal MK-ON=L) and data is to be transmitted from the internal bus, then the signal SE is an L-signal and the data gate 7b is controlled by the output signal of the AND gate 32 so that it passes data. With the signals at its output terminals a1 to a4, the direction controller R switches, as was described in connection with FIGS. 7a and 7b, the data gates 5b and 6b on so that the module can originate transmission to the associated busses X2 and Y1. If the module is not to originate transmission, then the transmit command SE disappears and the data gate 7a is switched on, while the direction controller R, as may also be seen from FIGS. 7a and 7b, switches one of the data gates 5a, 6a on so as to receive data into the module, depending on the prevailing coupling case, and couples, depending on the coupling case, the other data gate to the other bus for passing on the received message. For error monitoring, two data comparators 34 and 35 are provided which compare at any instant the data information occurring before and after the bidirectional couplers 5 and 6, respectively and, if they do not agree, deliver to the AND gates 36 and 37 an error signal which is linked via an OR gate 38 to the error signal ER and is fed to an error bus LE which is common to all modules. In case the internal switching-off signals X-OFF and Y-OFF delivered by the error processor belonging to the module are present, the transmission of an error signal is inhibited by means of the AND gates 36 and 37, respectively.

The principle of highly secure information distribution together with decentralized control of the information flow direction and error treatment, which can be realized with the bus matrix according to the present invention, can also be applied to the power supplies of each module if the latter are connected to each other by a separate matrix bus system.

Figure 9:
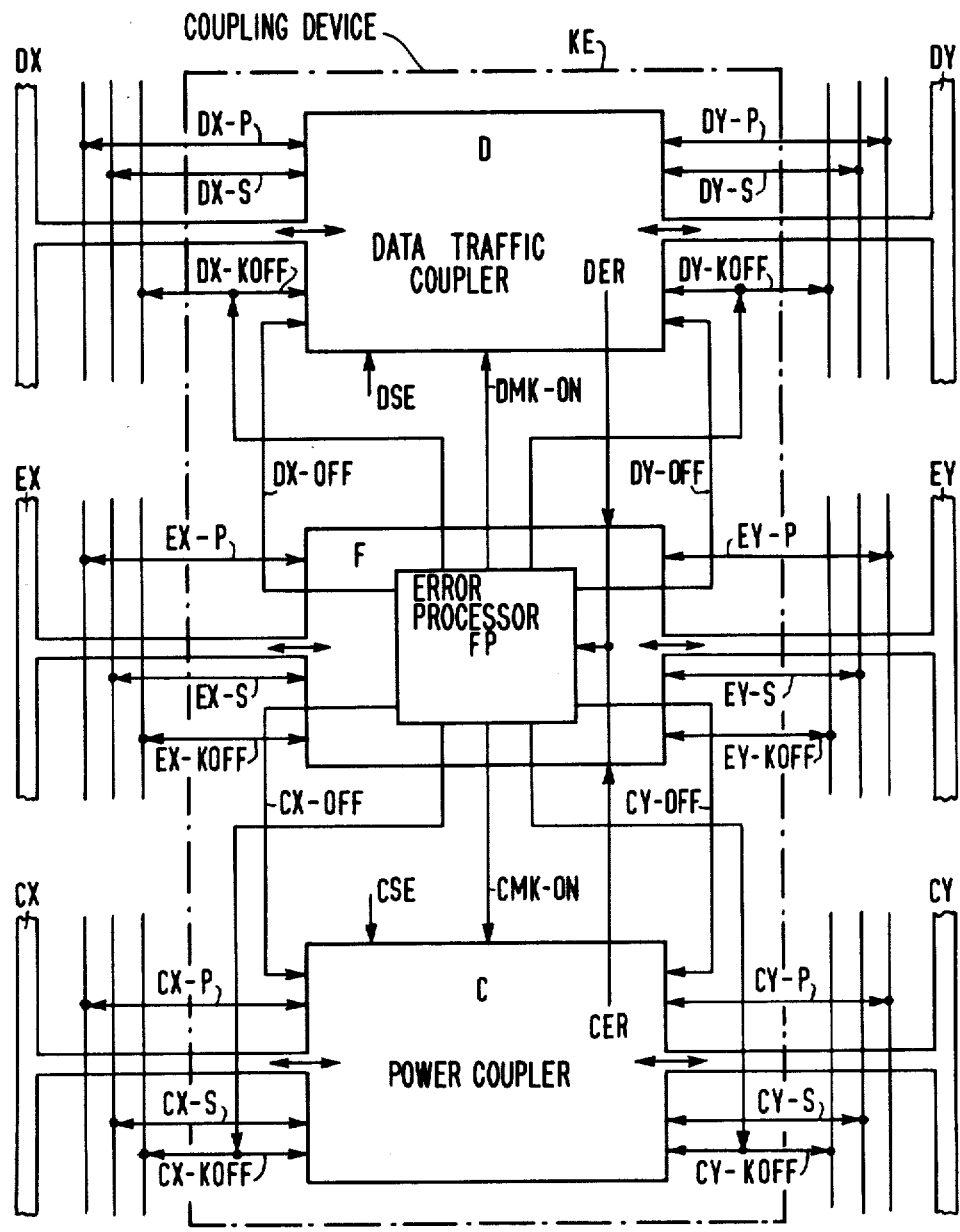
FIG. 9 is a block diagram of an extended form of the invention.

FIG. 9 is a block diagram of an extension of the coupling device KE of a module, which is again typical of the coupling units of all other modules. The coupling unit shown in FIG. 9 is divided into three parts which are designated D, F and C, the one designated D being provided for data traffic and corresponding to the coupling unit shown in FIG. 5, except that in FIG. 9 error processor FP and clock generator TG are relocated in the part of the coupling unit which is assigned to error processing and is designated with F. In this extension, it is a further difference that the error signal DER generated by the data comparators is not passed to the previously discussed error bus, but is passed via the error processor FP to a second error bus system, of which the busses designated EX and EY are assigned to the module shown in FIG. 9. This extension of the invention is otherwise designed according to FIG. 5 as far as the bus-accompanying lines are concerned and according to FIG. 1 as far as the matrix-like overall design is concerned. The control of the information flow as well as the coupling of the error busses EX and EY are accomplished in exactly the same manner as described before.

Part C of the coupling unit KE is associated with the power supply belonging to the module, which is connected via busses CX and CY, belonging to a matrix bus system, to the power supply devices of the other modules in exactly the same manner as the data busses. The coupling and the control of the power supply are accomplished in the same decentralized manner as the information distribution via the data busses. Analogously to the data gates of the bipolar couplers 5 and 6 shown in FIG. 8, the power supply coupling arrangement C has controlled semiconductor switches in the form of transistors, thyristors or field-effect transistors, by which the power supply unit of each module can be coupled bidirectionally to the busses, and power transmission is thus made possible from bus to bus. A power supply with extremely high security is thereby ensured, since in the event of a failure of the module's own power supply, the module in question can be supplied with power by the other modules due to the multiple redundancy. In analogy to the data gates of part D, corresponding voltages before and after the current gates are compared with each other and, if they do not agree, an error signal CER is transmitted to the module's own error processor, which transmits it to a channel of the error bus system. From there, it can be received by all error processors, the fault searching program of which is extended by a part relating to the power supply system so that the faulty module can be located and switched off.

It may also be found advantageous to transmit the clock signal of the clock generators of the modules furnished in the arrangement shown in FIG. 5 to a clock line LT which is commonly associated with all modules likewise to a channel in the error bus matrix system, and to receive it from there. In this manner, a highly secure, because multiply redundant, clock supply is obtained.

To achieve even greater transmission security and a considerably increased number of modules which can be coupled to each other, the two-dimensional bus matrix shown in FIG. 1 can be extended to form a three-dimensional bus matrix by an additional group of busses. Each coupling unit then contains three bidirectional couplers for coupling to the three busses which are associated with each module in matrix-fashion, where the coupling strategy can be retained unchanged and only the error processing programs would have to be extended accordingly. In an appropriate extension, an arbitrary n-dimensional bus matrix can also be realized, of course, where n can be greater than 3.

Overall, an arrangement for connecting a large number of data processing devices which are in communication with each other is provided by the present invention. The coupling arrangement is very flexible as far as processing volume is concerned and can be extended in modular fashion in always constant steps as far as reliability and availability are concerned. Additionally, the present invention provides an extremely reliable coupling arrangement at justifiable expense.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An arrangement for coupling digital processor modules, particularly of a redundantly operating multiprocessor system, comprising:
   a first external bus system having a first group and a second group of at least two external busses each, the modules being coupled in matrix-fashion to said first and second groups such that each module is coupled to one of the busses in the first group and one of the busses in the second group and no module is coupled to the same two busses;
   first bidirectional coupling means in each module which is provided with direction control means for controlling the direction of data through said coupling means said coupling means coupling the respective external busses coupled to the module to an internal bus of said module and thus also to each other; and
   at least one status line means accompanying each external bus coupled to each of the modules associated with the bus, a state of a selected one of said status line means associated with a bus in each of said first and second groups being determined by one of the modules transmitting as an originating module to said selected status lines means a status signal for controlling the coupling direction of the coupling means in each of the remaining modules coupled to at least one of said selected status line means so that a signal transmitted from the originating module to the selected busses in each of the first and second groups is supplied via the respective coupling means to the busses not coupled to said originating module, thereby supplying said signal from the originating module to all busses of said external bus system.

2. The arrangement recited in claim 1 wherein when the status signal states of the status line means accompanying each external bus coupled to a module which is not the originating module are the same, the internal bus of the module is coupled to a bus in only one of said two groups of busses.

3. The arrangement recited in claim 2, wherein said status line means further comprises a first status line assigned to each bus which carries a signal if the respective bus is a primary-fed bus, wherein said primary-fed bus is directly fed by said originating module and a second status line associated with each bus which carries a signal if the respective bus is a secondary-fed bus, wherein a secondary-fed bus is indirectly fed by a module which is not the originating module supplying a signal from the originating module, said direction control means of said bidirectional coupling means controlling said bidirectional coupling means so that the data on said primary-fed bus is transmitted with priority over the data on said secondary-fed bus.

4. The arrangement recited in claim 1, wherein each module further comprises:
   comparator means for monitoring the signal state at an input and output of each of said bidirectional coupling means, said comparator means generating an error signal when the signal states at the input and output of each of said bidirectional coupling means do not agree;
   a common error bus line to which said error signal is supplied;
   error processing means coupled to said error bus line, said error processing means for each module generating identical command sequences which are coordinated in time;
   clock generator means for controlling the operation of said error processing means;
   a common clock line means for mutually synchronizing said clock generator means of each of said modules;
   said error processing means generating, in dependence on the signal state of said common error bus line, signals for decoupling selected ones of said modules;

5. The arrangement recited in claim 4, further comprising external switching-off lines accompanying each bus, said external switching-off lines coupled to the modules associated with the bus and being driven by said error processing means of each of said modules, and gating means having said external switching-off lines as inputs, said gating means generating a signal for decoupling the associated module from the busses associated therewith when each of said switching-off signals is present.

6. The arrangement recited in claim 4, further comprising second bidirectional coupling means for coupling said internal bus to said first bidirectional coupling means, said second bidirectional coupling means responsive to a signal generated by said error processing means associated with the respective module.

7. The arrangement recited in claim 4, further comprising a second external bus system for transmitting error signals to and from said error processing means for each of said modules, said second external bus system associated in matrix-fashion with each of said error processing means in the same way as said first external bus system and allowing an error signal originating from one of said error processing means to be supplied to each of the other error processing means.

8. The arrangement recited in claim 7 further comprising:

power supply means in each of said modules having current coupling means; and a third external bus system for transmitting power between any of said modules via said current coupling means from any of said power supply means, said external bus system associated in matrix-fashion with each of said power supply means in the same way as said first and second external bus systems.

9. The arrangement recited in claim 1, further comprising a third group of at least two busses in said first external bus system associated with said modules in matrix fashion so that said external bus system comprises a three-dimensional bus system.

* * * * *